United States Patent
Yang et al.

(10) Patent No.: US 12,434,675 B2
(45) Date of Patent: Oct. 7, 2025

(54) METHOD FOR BRAKE FORCE COMPENSATION OF VEHICLE

(71) Applicants: Hyundai Motor Company, Seoul (KR); Kia Corporation, Seoul (KR)

(72) Inventors: Byeong-Cheol Yang, Bucheon-si (KR); Gwi-Chul Kim, Anyang-si (KR); Sung-In Ju, Hwaseong-si (KR); Sung-Keun Lim, Hwaseong-si (KR); Se-Won Chun, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 943 days.

(21) Appl. No.: 17/539,777

(22) Filed: Dec. 1, 2021

(65) Prior Publication Data
US 2022/0410852 A1 Dec. 29, 2022

(30) Foreign Application Priority Data
Jun. 29, 2021 (KR) .................. 10-2021-0084680

(51) Int. Cl.
*B60T 8/174* (2006.01)
*B60T 8/172* (2006.01)

(52) U.S. Cl.
CPC .............. *B60T 8/174* (2013.01); *B60T 8/172* (2013.01); *B60T 2210/12* (2013.01); *B60T 2210/30* (2013.01)

(58) Field of Classification Search
CPC ...... B60T 8/174; B60T 8/172; B60T 2210/12; B60T 2210/30; B60T 8/1763; B60T 8/17;
(Continued)

(56) References Cited

U.S. PATENT DOCUMENTS

2007/0194623 A1* 8/2007 Miyazaki .............. B60T 8/4081
  303/191
2014/0330466 A1* 11/2014 Bureau ................. B60W 20/40
  903/903
(Continued)

FOREIGN PATENT DOCUMENTS

| JP | 2000-082198 A | 3/2000 |
| JP | 2003-160046 A | 6/2003 |
(Continued)

OTHER PUBLICATIONS

Translation of JP2000082198A (Year: 2000).*

*Primary Examiner* — Fadey S. Jabr
(74) *Attorney, Agent, or Firm* — Morgan Lewis & Bockius LLP

(57) ABSTRACT

A method for controlling corrected target hydraulic brake force to be generated by estimating friction coefficient variation depending on a bushing degree of a brake friction material and a season change, may include: determining a hydraulic brake torque required for hydraulic braking according to a driver's request brake torque; converting the hydraulic brake torque into a brake hydraulic pressure by use of a torque factor which is a friction capability of a brake friction material in the hydraulic brake torque; and determining a correction amount of the torque factor according to a season and a bushing degree of the brake friction material, which influences a friction coefficient which is an element of the torque factor.

19 Claims, 5 Drawing Sheets

(58) Field of Classification Search
CPC ......... B60T 2250/062; B60T 2270/308; B60T 2270/311; B60T 2270/60; B60W 60/00182

See application file for complete search history.

(56) References Cited

U.S. PATENT DOCUMENTS

| | | | |
|---|---|---|---|
| 2015/0336458 A1* | 11/2015 | Lee | B60L 7/26 |
| | | | 701/70 |
| 2018/0201241 A1 | 7/2018 | Takae et al. | |
| 2019/0263268 A1* | 8/2019 | Fracchia | B60T 13/586 |
| 2021/0323571 A1* | 10/2021 | Baehrle-Miller | B60W 60/001 |
| 2024/0278756 A1* | 8/2024 | Dijken | B60T 8/1761 |

FOREIGN PATENT DOCUMENTS

| | | |
|---|---|---|
| JP | 2009-119889 A | 6/2009 |
| JP | 2013-256277 A | 12/2013 |
| KR | 10-2019-0094801 A | 8/2019 |
| KR | 10-2006827 B1 | 10/2019 |
| KR | 10-2048583 B1 | 11/2019 |
| KR | 10-2048888 B1 | 11/2019 |
| KR | 10-2020-0122440 A | 10/2020 |

* cited by examiner

FIG. 7

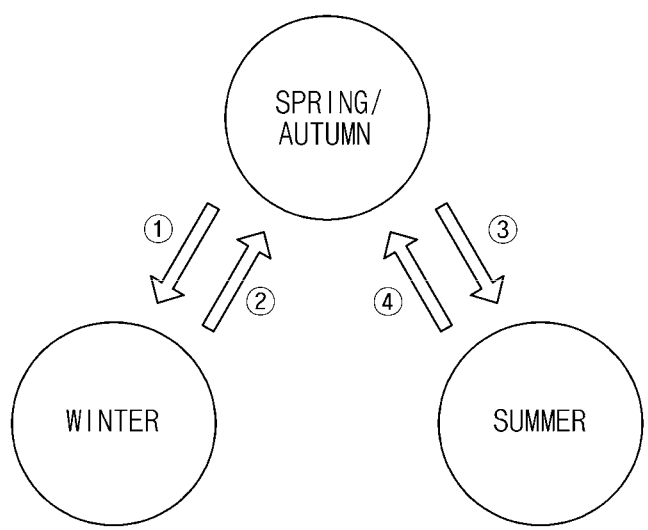

| SEASON | CORRECTION AMOUNT |
|---|---|
| SPRING/AUTUMN | 0 |
| WINTER | α |
| SUMMER | β |

FIG. 8

REGION 1
```
A = A1
B = B1
C = C1
D = D1
E = E1
Twinter = T1,winter
Tsummer = T1,summer
ΔTwinter = ΔT1,winter
ΔTsummer = ΔT1,summer
```

REGION 2
```
A = A2
B = B3
C = C2
D = D2
E = E2
Twinter = T2,winter
Tsummer = T2,summer
ΔTwinter = ΔT2,winter
ΔTsummer = ΔT2,summer
```

. . . . .

REGION n
```
A = An
B = Bn
C = Cn
D = Dn
E = En
Twinter = Tn,winter
Tsummer = Tn,summer
ΔTwinter = ΔTn,winter
ΔTsummer = ΔTn,summer
```

METHOD FOR BRAKE FORCE COMPENSATION OF VEHICLE

CROSS-REFERENCE TO RELATED APPLICATIONS

The present application claims priority to Korean Patent Application No. 10-2021-0084680, filed on Jun. 29, 2021, the entire contents of which is incorporated herein for all purposes by this reference.

BACKGROUND OF THE INVENTION

Field of the Invention

The present invention relates to a method for brake force compensation of a vehicle, and more particularly, to a method for controlling corrected target hydraulic brake force by estimating friction coefficient variation depending on a bushing degree of a brake friction material and a seasonal change.

Description of Related Art

Since a friction coefficient of a vehicle brake friction material is changed depending on a bushing degree thereof or a seasonal change, brake force desired by a drive may not be generated. For example, when a brake friction material has a high bushing degree, the friction coefficient may become larger, and the friction coefficient in the winter may be greater than that in the summer. Accordingly, it is necessary to compensate a brake force deviation depending on the seasonal change or the bushing degree of the friction material.

Meanwhile, generally the brake force correction scheme corrects the brake force through feedback of a value generated by a direct influence from the brake force.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an invention that may correct a brake force deviation depending on a seasonal change or a bushing degree of a friction material, and proactively correct brake force through feedforward control based on an accumulated hydraulic brake energy value.

Various aspects of the present invention are directed to providing a method for brake force compensation of a vehicle, which includes: determining a hydraulic brake torque required for hydraulic braking according to a driver's request brake torque; converting the hydraulic brake torque into a brake hydraulic pressure by use of a torque factor which is a friction capability of a brake friction material in the hydraulic brake torque; and determining a correction amount of the torque factor according to a season and a bushing degree of the brake friction material, which influences a friction coefficient which is an element of the torque factor.

The target hydraulic brake torque may be determined by subtracting regenerative brake torque from the driver's request brake torque.

A first correction gain required for determining the correction amount of the torque factor depending on the bushing degree of the brake friction material may be determined in conjunction with a driving mileage of the vehicle.

A second correction gain required for determining the correction amount of the torque factor depending on the bushing degree of the brake friction material may be determined by determining an accumulation amount of hydraulic brake energy.

The hydraulic brake energy may be determined according to an equation below.

$$\Delta E_{friction} = \int_0^{\Delta t} F \cdot v \cdot \Delta t \qquad <\text{Equation}>$$
$$= \int_0^{\Delta t} \frac{\sum C_p \cdot P_{whl}}{R_{tire}} \cdot v \cdot \Delta t$$

Here, Cp represents a brake factor, Pwhl represents wheel brake hydraulic pressure, R represents a dynamic radius of a tire, v represents a vehicle velocity, and Δt represents an execution cycle.

The correction amount of the torque factor depending on the season may be determined as a correction amount predetermined according to a current season estimated by considering at least one information of date information, region information, a vehicle outer temperature, and a vehicle inner temperature.

When the date information exists in a specific date (A<date<B), an average vehicle outer temperature is less than a specific value (T_outer<T_winter), and an initial vehicle inner temperature change rate after the vehicle is started is equal to or greater than a specific value (ΔT_inner≥ΔT_winter), it may be determined that the season is changed from autumn to winter.

When the date information exists in a specific date (B<date<C or D<date<E) or the average vehicle outer temperature exists in a specific section (T_winter≤T_outer≤T_summer), it may be determined that the season is changed from winter to spring or the season is changed from summer to autumn.

When the date information exists in a specific date (E<date<A), the average vehicle outer temperature is greater than a specific value (T_outer>T_summer), and the initial vehicle inner temperature change rate after the vehicle is started is equal to or less than a specific value (ΔT_inner≤ΔT_summer), it may be determined that the season is changed from spring to summer.

According to various exemplary embodiments of the present invention, it is possible to reduce a brake force deviation by proactively correcting a change in friction coefficient depending on a seasonal change or a bushing degree of a friction material.

According to various exemplary embodiments of the present invention, it is possible to determine a correction amount of torque factor depending on a bushing degree of a brake friction material by considering a vehicle driving mileage and an accumulation amount of hydraulic brake energy.

According to various exemplary embodiments of the present invention, it is possible to differently set the compensation amount of torque factor for each season and to estimate a season for each region.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 7 is a diagram illustrating a torque factor correction amount depending on a season.

FIG. 8 is a diagram separately illustrating regional determination and a season estimation-related variable for each region in FIG. 6.

Figure 1:
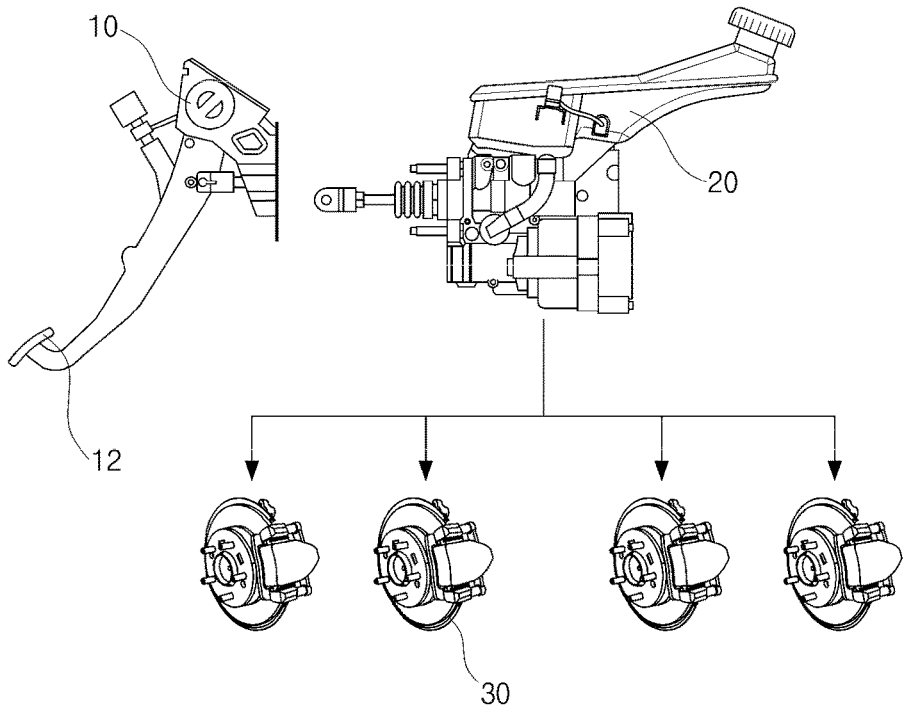
FIG. 1 is a diagram illustrating an example of a brake system to which a method for brake force compensation of a vehicle according to various exemplary embodiments of the present invention may be applied.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in portion by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the contrary, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, exemplary embodiments of a method for brake force compensation of a vehicle according to various exemplary embodiments of the present invention will be described in detail with reference to drawings. Terms or words used herein may not be interpreted as being limited to ordinary or lexical meanings and may be interpreted as meanings and concepts which match the technical spirit of the present invention based on a principle in which an inventor can appropriately define concepts of the terms to describe his or her invention by the best method.

FIG. 1 is a diagram illustrating an example of a brake system to which a method for brake force compensation of a vehicle according to various exemplary embodiments of the present invention may be applied.

FIG. 1 illustrates an example of a brake hardware system to which various exemplary embodiments of the present invention may be applied. Referring to FIG. 1, a brake pedal stroke sensor 10 senses a driver's request brake amount when a driver steps on a brake pedal 12. A pressure sensor may be used instead of the brake pedal stroke sensor 10. In the instant case, a brake electronic control unit (ECU) determines brake torque desired by a driver according to information input from the brake pedal stroke sensor 10, and controls an actuator and a solenoid valve to generate brake hydraulic pressure transmitted to each wheel. The brake hydraulic pressure transmitted to each wheel is transmitted to a brake caliper 30 to generate friction brake force between a disk and a brake pad. Meanwhile, reference numeral 20 illustrated in FIG. 1 represents an integrated brake modulator including a brake ECU, an actuator (motor), and a solenoid valve.

Figure 2:
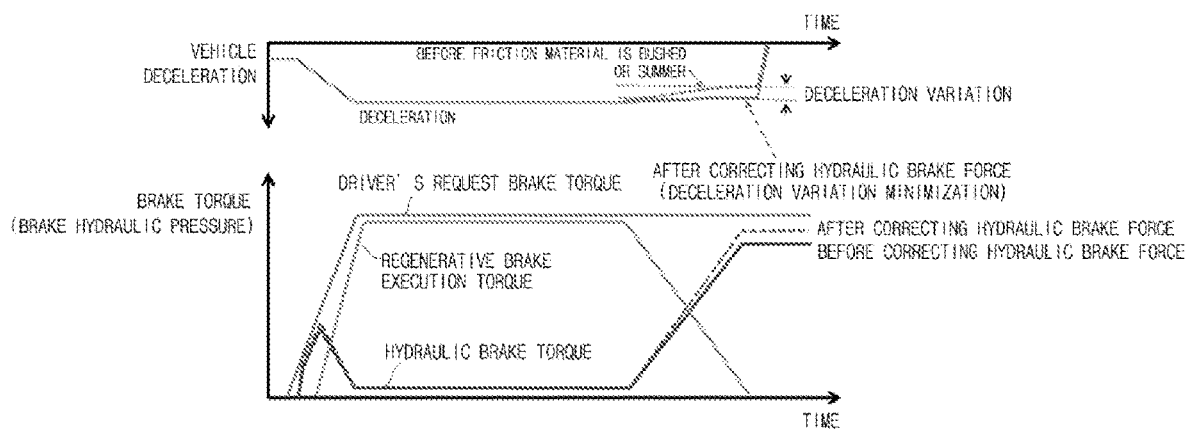
FIG. 2 is a graph of comparing a deceleration and target hydraulic brake torque before and after applying the method for brake force compensation of a vehicle according to the exemplary embodiment of the present invention.

FIG. 2 is a graph of comparing a deceleration and a target hydraulic brake torque before and after applying the method for brake force compensation of a vehicle according to the exemplary embodiment of the present invention.

A brake friction material has a different friction capability depending on a bushing degree thereof and a season. For example, in the summer, a brake friction coefficient is generally low due to high humidity, and in the winter, the friction coefficient becomes higher due to low humidity. Furthermore, when the brake friction material is not bushed, the friction coefficient is lower than that when the brake friction coefficient is bushed.

As illustrated in FIG. 2, in a season (e.g., summer) in which the brake friction material is not bushed or the friction coefficient of the brake friction material is low, a time when a deceleration of a vehicle decreases or a target hydraulic brake force decreases appears as compared with a season (e.g., spring or autumn) in which the brake friction material is bushed or the friction coefficient is high. Here, the target hydraulic brake force will be described below. The insufficient brake force may cause a safety accident. Therefore, a method for correcting the brake force is required.

Figure 3:
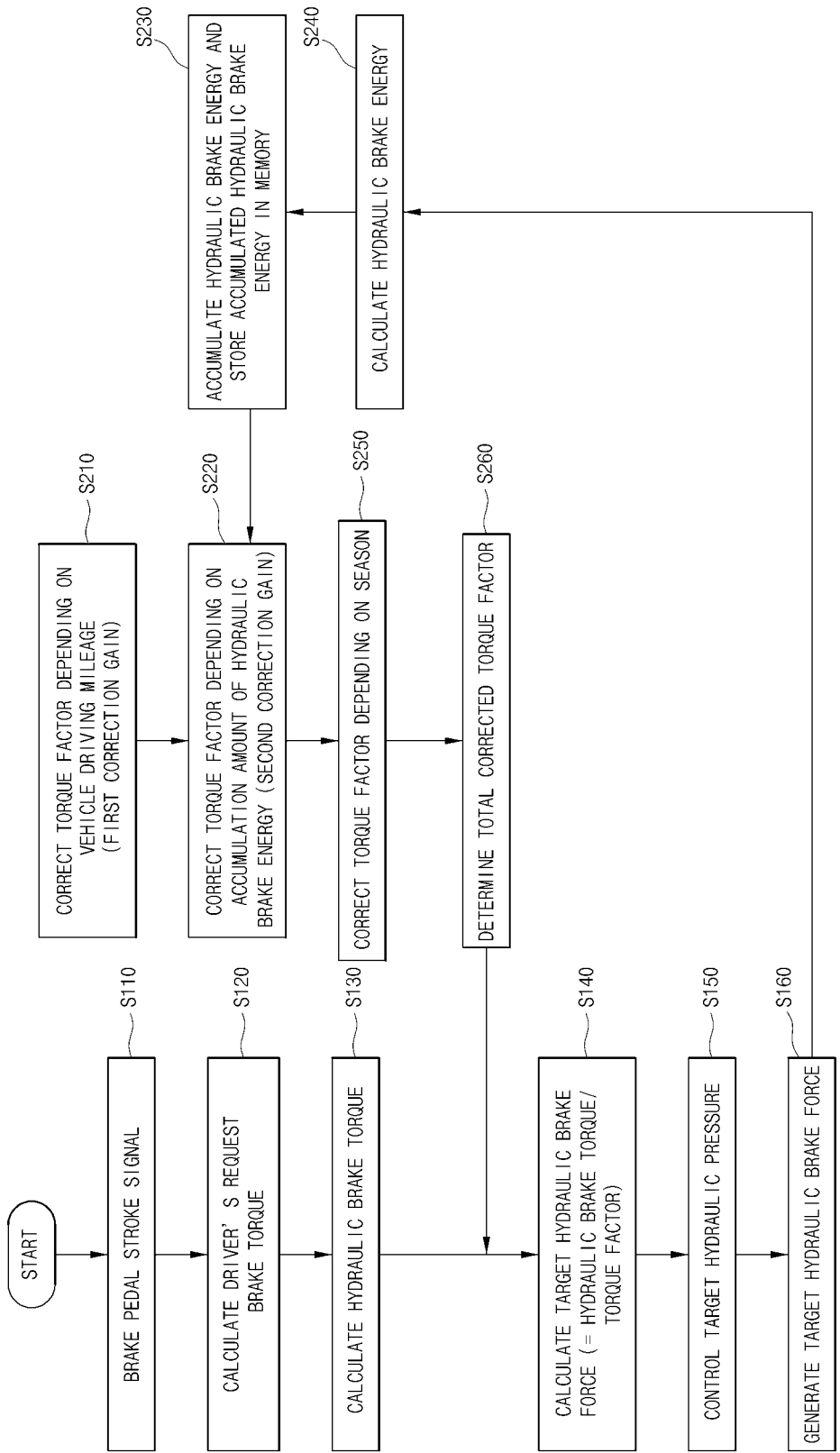
FIG. 3 is a flowchart showing the method for brake force compensation of a vehicle according to the exemplary embodiment of the present invention.

FIG. 3 is a flowchart showing the method for brake force compensation of a vehicle according to the exemplary embodiment of the present invention.

As illustrated in FIG. 3, first, the brake ECU receives a brake pedal stroke signal (S110), and determines the driver's request brake force (S120). Thereafter, the brake ECU determines hydraulic brake torque required for braking based on the driver's request brake torque (S130). Since regenerative brake is performed in the case of an environment-friendly vehicle driven by a motor, the brake ECU further determines the regenerative brake torque. Accordingly, in the case of the environment-friendly vehicle in which the regenerative brake is performed, the hydraulic brake torque is determined by subtracting the regenerative brake torque from the driver's request brake torque.

Thereafter, the brake ECU divides the hydraulic brake torque by a torque factor to determine the target hydraulic brake force. Here, the torque factor may be determined by Equation 1 below.

Torque factor=friction coefficient×caliper piston area×disk valid radius    <Equation 1>

Meanwhile, the hydraulic brake torque has a unit of Nm, and the torque factor has a unit of Nm/bar. Accordingly, dividing the hydraulic brake torque by the torque factor means converting a physical mount of torque into a physical amount of hydraulic pressure.

The friction coefficient among the elements of the torque factor is changed depending on the season and the bushing degree of the brake friction material. Accordingly, it is necessary to correct the torque factor depending on an element which influences the friction coefficient of the brake friction material.

First, a method for correcting, by the brake ECU, the torque factor depending on the bushing degree of the brake friction material will be described.

For convenience of understanding, for example, under a condition in which bushing between a brake pad and a disk is not performed, when the brake hydraulic pressure is controlled with 1 bar by the caliper, brake torque of 45 Nm is generated. After the bushing is completed, brake torque of 50 Nm is generated. Accordingly, under a condition in which the brake friction material is not bushed, when a brake hydraulic pressure control amount is additionally raised by 10% to control brake hydraulic pressure of 1.1 bar, intended brake torque of 50 Nm is generated.

Figure 4A:
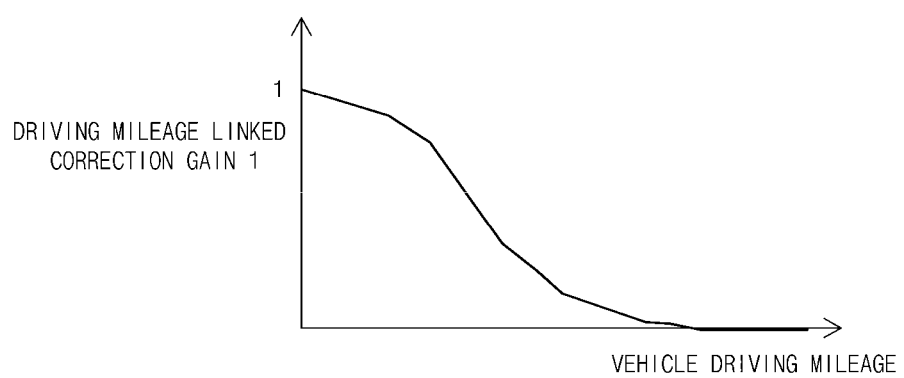
FIG. 4A is a graph of a torque factor correction gain depending on a driving mileage of a vehicle and FIG. 4B is a graph of a torque factor correction gain depending on an accumulation amount of hydraulic brake energy.
Figure 4B:
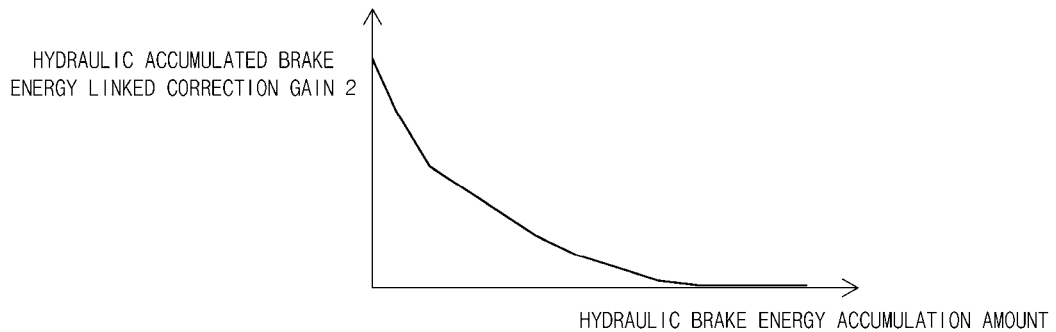
Figure 5:
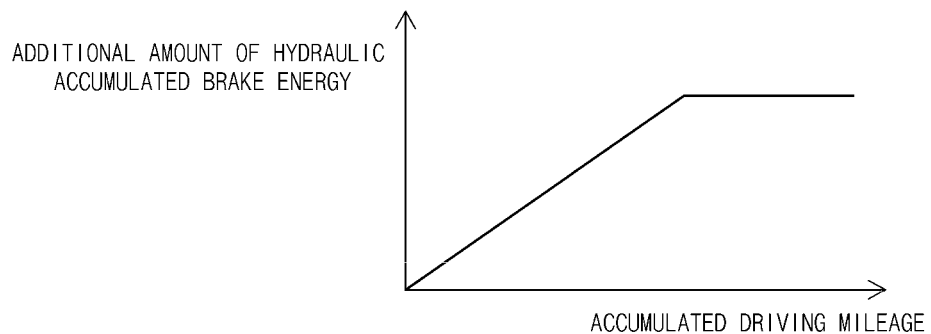
FIG. 5 is a graph showing correction of hydraulic brake energy depending on a driving mileage of a vehicle at the time of replacing an integrated brake modulator.

FIG. 4A is a graph of a torque factor correction gain depending on a driving mileage of a vehicle, FIG. 4B is a graph of a torque factor correction gain depending on an accumulation amount of hydraulic brake energy, and FIG. 5 is a graph showing correction of hydraulic brake energy depending on a driving mileage of a vehicle at the time of replacing an integrated brake modulator.

The torque factor correction amount depending on the bushing degree of the brake friction material may be determined by two types of correction gains.

A first correction gain is determined in conjunction with the driving mileage of the vehicle (S210). Referring to FIG. 4A, the larger the driving mileage of the vehicle, the smaller the first correction gain. In the instant case, it may be regarded that the larger the driving mileage of the vehicle, the larger the bushing degree of the brake friction material. As illustrated in FIG. 4A, the first correction gain may have a value between 0 and 1. In the case of a new car, since the driving mileage of the vehicle is small, the value of the first correction gain is close to 1.

A second correction gain is determined according to an accumulation amount of the hydraulic brake energy of the vehicle (S220). Referring to FIG. 4B, the larger the accumulation amount of the hydraulic brake energy of the vehicle, the smaller the second correction gain. In the instant case, it may be regarded that the larger the accumulation amount of the hydraulic brake energy of the vehicle, the larger the bushing degree of the brake friction material. As illustrated in FIG. 4B, the second correction gain may have a value between 0 and 1. In the case of a new car, since the accumulation amount of the hydraulic brake energy of the vehicle is small, the value of the second correction gain is close to 1.

The accumulation amount of the hydraulic brake energy may be determined by the sum of an accumulation amount of previous hydraulic brake energy and current hydraulic brake energy, and the determined accumulation amount may be stored in a memory (S230). The hydraulic brake energy may be determined by Equation 2 below (S240).

$$\Delta E_{friction} = \int_0^{\Delta t} F \cdot v \cdot \Delta t$$  < Equation 2 >

$$= \int_0^{\Delta t} \frac{\sum C_p \cdot P_{whl}}{R_{tire}} \cdot v \cdot \Delta t$$

Here, Cp represents a brake factor, Pwhl represents wheel brake hydraulic pressure, R represents a dynamic radius of a tire, v represents a vehicle speed, and $\Delta t$ represents an execution cycle.

FIG. 5 is a graph showing correction of hydraulic brake energy depending on a driving mileage of a vehicle at the time of replacing an integrated brake modulator.

Meanwhile, when the integrated brake modulator is replaced, it is necessary to correct the accumulation amount of the hydraulic brake energy. As illustrated in FIG. 5, as a current driving mileage of a vehicle becomes larger, the accumulation amount of the hydraulic brake energy is added (the aforementioned accumulation amount of the previous hydraulic brake energy).

Figure 6:
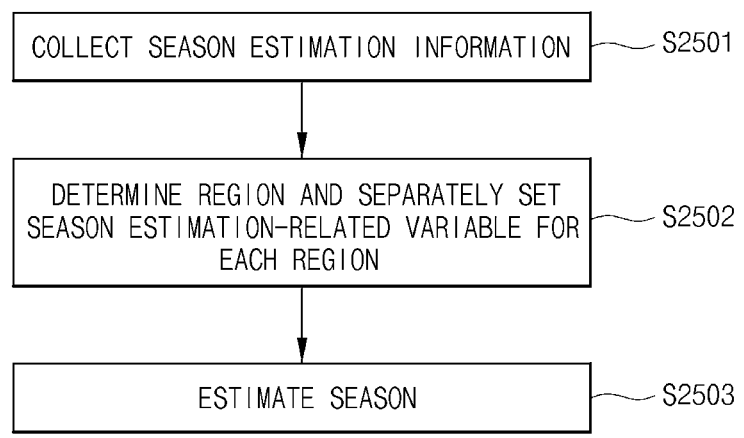
FIG. 6 is a flowchart for describing a torque factor correcting process depending on a season.

FIG. 6 is a flowchart for describing a torque factor correcting process depending on a season, FIG. 7 is a diagram illustrating a torque factor correction amount depending on a season, and FIG. 8 is a diagram separately illustrating regional determination and a season estimation-related variable for each region in FIG. 6.

Next, the brake ECU corrects the torque factor depending on the season (S250). When the season is changed, there occurs a deviation in brake feel due to a change in friction coefficient.

Referring to FIG. 6, first, the brake ECU collects information for estimating the season (S2501). Examples of the information for estimating the season includes date information, region information, a vehicle outer temperature, and a vehicle inner temperature. In the instant case, the date information and the region information may be collected from a GPS, a navigation system, an IoT, etc., and the vehicle outer temperature and the vehicle inner temperature may be collected from a temperature mounted in the vehicle, etc.

Next, as illustrated in FIG. 6, a current region where a vehicle is located is determined, and a season estimation-related variable is set separately for each region (S2502). The season estimation-related variable will be described below.

Various aspects of the present invention are directed to providing a method for estimating a current season. of course, the current season may be estimated only by use of the date information. However, since a seasonal weather depending on the date information and an actual seasonal weather may be different from each other due to a climate change, it is appropriate to correct the brake force by estimating the actual seasonal weather.

FIG. 7 illustrates a seasonal change. In the instant case, a method for estimating the change of each season is shown in Table 1 below. In Table 1 below, a transition section means the change of the season, and transition sections ☐, ☐, ☐, and ☐ are illustrated in FIG. 7. A transition condition means a condition for estimating the change of the season.

TABLE 1

| Transition section | Transition condition |
|---|---|
| ① | Date information exists in specific date (A < date < B) <br> AND <br> Average vehicle outer temperature is less than specific value (T_outer < T_winter) <br> AND <br> Initial vehicle inner temperature change rate after start is equal to or greater than specific value (ΔT_inner ≥ ΔT_winter) |
| ②/④ | Date information exists in specific date (B < date < C or D < date < E) <br> OR <br> Average vehicle outer temperature exists in specific section (T_winter ≤ T_outer ≤ T_summer) |
| ③ | Date information exists in specific date (E < date < A) <br> AND <br> Average vehicle outer temperature is more than specific value (T_outer > T_summer) <br> AND <br> Initial vehicle inner temperature change rate after start is equal to or less than specific value (ΔT_inner ≤ ΔT_summer) |

Here, specific dates A, B, C, D, and E, a predetermined winter temperature T_winter, a predetermined summer temperature T_summer, a predetermined winter temperature change amount ΔT_winter, a predetermined summer temperature change amount ΔT_summer, a vehicle outer temperature T_outer, and a vehicle inner temperature change amount ΔT_inner are referred to as season estimation-related variables.

Meanwhile, referring to the correction amount depending on the season as illustrated in FIG. 7, the correction amount is 0 for spring and autumn and correction amounts α and β are for winter and summer, respectively.

As described above, the season estimation-related variable may be set differently for each region. First, the current region where the vehicle is located may be determined through latitude and longitude information collected through the GPS mounted in the vehicle, etc.

When latitude 1_Low≤current latitude≤latitude 1_High, and longitude 1_Low≤current longitude≤longitude 1_High, the region is determined as region 1, latitude 2_Low≤current latitude≤latitude 2_High and longitude 2_Low≤current longitude≤longitude 2_High, the region is determined as region 2, and when latitude n_Low≤current latitude≤latitude n_High, and longitude n_Low≤current longitude≤longitude n_High, the region is determined as region n.

When a current region where the vehicle is being driven, the season estimation-related variable is set for each region. In FIG. 8, the season estimation-related variable for each region is illustrated. By use of the season estimation-related variable set as described above, the transition condition of Table 1 above is determined, and then the current season is estimated (S2503).

Referring back to FIG. 3, thereafter, when the torque factor correction depending on the season is performed, a total corrected torque factor is determined (S260). The total corrected torque factor is determined by summing a basic torque factor and the aforementioned torque factor correction amount (the bushing degree of the brake friction material and the torque factor correction amount depending on the season). In the instant case, the torque factor correction amount may be obtained as in Equation 3 below.

Torque factor correction amount=first correction gain×second correction gain×basic correction constant+torque factor correction amount depending on season     <Equation 3>

The basic correction constant indicates a correction amount of a torque factor of a new vehicle state which is an initial state in which the brake friction material is not bushed, and the basic correction constant is a value predetermined according to the brake friction material.

The brake ECU divides the corrected torque factor by the hydraulic brake torque to determine the target hydraulic brake force (S140). Thereafter, the brake ECU controls the target hydraulic pressure to be generated according to the determined target hydraulic brake force (S150).

Meanwhile, when the target hydraulic brake force is generated (S160), the brake ECU determines and accumulates the generated hydraulic brake energy (S240 and S230).

In addition, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "interior", "exterior", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method for brake force compensation for a brake apparatus of a vehicle, the method comprising:
    determining, by a controller, hydraulic brake torque required for hydraulic braking of the brake apparatus according to a driver's request brake torque;
    converting, by the controller, the hydraulic brake torque into a brake hydraulic pressure by use of a torque factor which is a friction capability of a brake friction material in the hydraulic brake torque;
    determining, by the controller, a correction amount of the torque factor according to a season and a bushing degree of the brake friction material, which influences a friction coefficient of the brake friction material which is an element of the torque factor, so as to determine a target hydraulic brake torque; and
    controlling the brake apparatus according to the determined target hydraulic brake force.

2. The method of claim 1, wherein the hydraulic brake torque is further determined by subtracting regenerative brake torque from the driver's request brake torque.

3. The method of claim 1, wherein a first correction gain required for determining the correction amount of the torque factor depending on the bushing degree of the brake friction material is determined in conjunction with a driving mileage of the vehicle.

4. The method of claim 1, wherein a second correction gain required for determining the correction amount of the torque factor depending on the bushing degree of the brake friction material is determined by determining an accumulation amount of hydraulic brake energy.

5. The method of claim 4, wherein the hydraulic brake energy is determined according to an equation below:

$$\Delta E_{friction} = \int_0^{\Delta t} F \cdot v \cdot \Delta t$$
$$= \int_0^{\Delta t} \frac{\sum C_p \cdot P_{whl}}{R_{tire}} \cdot v \cdot \Delta t$$

wherein Cp represents a brake factor, Pwhl represents wheel brake hydraulic pressure, R represents a dynamic radius of a tire, v represents a vehicle velocity, and Δt represents an execution cycle.

6. The method of claim 1, wherein the correction amount of the torque factor depending on the season is determined as a correction amount predetermined according to a current season estimated by considering at least one information of date information, region information, a vehicle outer temperature, and a vehicle inner temperature.

7. The method of claim 6, wherein when the date information exists in a predetermined range of dates, an average vehicle outer temperature is less than a predetermined winter temperature, and an initial vehicle inner temperature change rate after the vehicle is started is equal to or greater than a predetermined winter temperature change amount, the controller concludes that the season is changed from autumn to winter.

8. The method of claim 6, wherein when the date information exists in a predetermined range of dates or an average vehicle outer temperature exists between a predetermined winter temperature and a predetermined summer temperature, the controller concludes that the season is changed from winter to spring or the season is changed from summer to autumn.

9. The method of claim 6, wherein when the date information exists in a predetermined range of dates, an average vehicle outer temperature is greater than a predetermined summer temperature, and an initial vehicle inner temperature change rate after the vehicle is started is equal to or less than a predetermined summer temperature change amount, the controller concludes that the season is changed from spring to summer.

10. A non-transitory computer readable storage medium on which a program for performing the method of claim 1 is recorded.

11. A brake apparatus for brake force compensation of a vehicle, the brake apparatus comprising:
    a sensor configured for sensing a driver's request brake amount in response to a driver's stepping on a brake pedal;
    a controller electrically connected to the sensor and configured for:
        determining a hydraulic brake torque required for hydraulic braking of the brake apparatus according to a request brake torque determined from the driver's request brake amount;
        converting the determined hydraulic brake torque into a brake hydraulic pressure by use of a torque factor which is a friction capability of a brake friction material in the hydraulic brake torque;
        determining a correction amount of the torque factor according to a season and a bushing degree of the brake friction material, which influences a friction coefficient of the brake friction material which is an element of the torque factor, so as to determine a target hydraulic brake torque; and controlling the brake apparatus according to the determined target hydraulic brake force.

12. The brake apparatus of claim 11, the hydraulic brake torque is further determined by subtracting regenerative brake torque from the driver's request brake torque.

13. The brake apparatus of claim 11, wherein a first correction gain required for determining the correction amount of the torque factor depending on the bushing degree of the brake friction material is determined in conjunction with a driving mileage of the vehicle.

14. The brake apparatus of claim 11, wherein a second correction gain required for determining the correction amount of the torque factor depending on the bushing degree of the brake friction material is determined by determining an accumulation amount of hydraulic brake energy.

15. The brake apparatus of claim 14, wherein the hydraulic brake energy is determined according to an equation below:

$$\Delta E_{friction} = \int_0^{\Delta t} F \cdot v \cdot \Delta t$$
$$= \int_0^{\Delta t} \frac{\sum C_p \cdot P_{whl}}{R_{tire}} \cdot v \cdot \Delta t$$

wherein Cp represents a brake factor, Pwhl represents wheel brake hydraulic pressure, R represents a dynamic radius of a tire, v represents a vehicle velocity, and Δt represents an execution cycle.

16. The brake apparatus of claim 11, wherein the correction amount of the torque factor depending on the season is determined as a correction amount predetermined according to a current season estimated by considering at least one information of date information, region information, a vehicle outer temperature, and a vehicle inner temperature.

17. The brake apparatus of claim 16, wherein when the date information exists in a predetermined range of dates, an average vehicle outer temperature is less than a predetermined winter temperature, and an initial vehicle inner temperature change rate after the vehicle is started is equal to or greater than a predetermined winter temperature change amount, the controller concludes that the season is changed from autumn to winter.

18. The brake apparatus of claim 16, wherein when the date information exists in a predetermined range of dates or an average vehicle outer temperature exists between a predetermined winter temperature and a predetermined summer temperature, the controller concludes that the season is changed from winter to spring or the season is changed from summer to autumn.

19. The brake apparatus of claim 16, wherein when the date information exists in a predetermined range of dates, an average vehicle outer temperature is greater than a predetermined summer temperature, and an initial vehicle inner temperature change rate after the vehicle is started is equal to or less than a predetermined summer temperature change amount, the controller concludes that the season is changed from spring to summer.

* * * * *